(12) United States Patent
Ono

(10) Patent No.: US 6,952,277 B1
(45) Date of Patent: Oct. 4, 2005

(54) MULTIFUNCTIONAL PROCESSING APPARATUS AND METHOD

(75) Inventor: Masafumi Ono, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/207,464

(22) Filed: Dec. 8, 1998

(30) Foreign Application Priority Data

Dec. 19, 1997 (JP) .............................................. 9-350404

(51) Int. Cl.$^7$ .......................... G06F 15/00; G06K 1/00
(52) U.S. Cl. ...................... 358/1.15; 358/1.15; 358/468
(58) Field of Search ................................ 358/1.15, 468

(56) References Cited

U.S. PATENT DOCUMENTS

| | | | | |
|---|---|---|---|---|
| 5,724,154 A | * | 3/1998 | Ito et al. ...................... | 358/400 |
| 5,764,866 A | * | 6/1998 | Maniwa ....................... | 395/114 |
| 5,815,280 A | * | 9/1998 | Ohmura et al. .............. | 358/296 |
| 6,025,924 A | * | 2/2000 | Miura et al. ................ | 358/1.15 |
| 6,057,939 A | * | 5/2000 | Cho ............................ | 358/401 |
| 6,070,000 A | * | 5/2000 | Mori .......................... | 358/1.15 |

FOREIGN PATENT DOCUMENTS

| | | |
|---|---|---|
| JP | A-5-75767 | 3/1993 |
| JP | A-5-75769 | 3/1993 |
| JP | A-6-6540 | 1/1994 |
| JP | A 6-22063 | 1/1994 |
| JP | A 6-152814 | 5/1994 |
| JP | A 09-023741 | 1/1997 |
| JP | A 09-097126 | 4/1997 |
| JP | A 9-312715 | 12/1997 |

OTHER PUBLICATIONS

Livingston et al., Windows 95 SECRETS, 1995, IDG Books Worldwide, Inc., pp. 55–56.*

* cited by examiner

Primary Examiner—Mark Wallerson
(74) Attorney, Agent, or Firm—Oliff & Berridge, PLC

(57) ABSTRACT

A multifunctional processing apparatus is comprised of a first controller for controlling the operation of exercising a plural number of functions, a connector, to which a second controller for controlling the operation of exercising the same function as at least one of the plural number of functions is connected, a recognizer for recognizing the connection of the second controller to the connection means, and a control selector for causing one of the first and second controllers to control one function upon recognition of the connection by the recognizer.

14 Claims, 6 Drawing Sheets

MULTIFUNCTIONAL PROCESSING APPARATUS AND METHOD

BACKGROUND OF THE INVENTION

The present invention relates to a multifunctional processing apparatus and method for controlling the operations of exercising a plural number of functions. More particularly, the invention relates to a multifunctional processing apparatus and method used for a multifunctional digital machine having copy, printer and facsimile functions.

A multifunctional digital machine is known which is constructed on the basis of a digital copying machine having a copy function, and has additional functions of printer and facsimile machine (as disclosed in, for example, the Unexamined Japanese Patent Application Publication Nos. Hei 5-75767, Hei 5-75769, and Hei 6-6540). The multifunctional digital machine usually uses a multifunctional processing apparatus for controlling the operations of exercising a multiple of functions of copy, printer and facsimile.

In the conventional multifunctional processing apparatus, as shown in FIG. 7, the operations of exercising those functions are controlled in a manner that a single CPU (central processing unit) executes a copy control program 52 to control the operations of exercising the copy function, a printer control program 53 to control the operation of exercising the printer function, or a facsimile function to control the operation of exercising the facsimile function.

The multifunctional processing apparatus of FIG. 7 controls the operations of exercising those functions by use of one CPU. Because of this, in a situation where the plural controls are competitive, a time divisional processing needs to be used for those controls. This makes it difficult to process the controls at high speed.

Another conventional multifunctional processing apparatus is illustrated in FIG. 8. In the apparatus, control units 61 to 63 perform their own controls, respectively. Therefore, in the case where plural controls are competitive, these controls may be processed in a parallel manner. Therefore, a quick control processing is realized. However, the following problem arises in the multifunctional processing apparatus. The CPUs or the control units 61 to 63 are used for the controls of the respective functions, respectively. To construct a multifunctional digital machine capable of handling the plural number of functions, the plural number of control units 61 to 63 each including a CPU are essential. This leads to complexity of the machine construction and makes it impossible to realize an inexpensive multifunctional digital machine.

SUMMARY OF THE INVENTION

Accordingly, an object of the present invention is to provide a multifunctional processing apparatus which enables one CPU to control the operations of exercising a plural number of functions in order to provide an inexpensive multifunctional digital machine and is readily adaptable for the extension of the function in order to improve the functions and performances.

Another object of the present invention is to provide a multifunctional processing apparatus enables one CPU to control the operations of exercising a plural number of functions, and is readily adaptable for the function extension to improve the functions and performances.

According to the present invention, there is provided a multifunctional processing apparatus comprising: first control means for controlling the operation of exercising a plural number of functions; connection means to which second control means for controlling the operation of exercising the same function as at least one of the plural number of functions is connected; recognizing means for recognizing the connection of the second control means to the connection means; and control select means for causing one of the first and second control means to control one function upon recognition of the connection by the recognizing means.

In the multifunctional processing apparatus, when the recognizing means recognizes the connection of the second control means, the control select means causes the first or second control means to control the operation of exercising one function that the second control means can control. Therefore, if the apparatus is not provided with the second control means, the first control means controls the operations of exercising the plural number of functions. In this state, if the second control means is connected to the connection means, the first and second control means perform the control operations in a parallel fashion.

According to another aspect of the invention, there is provided a multifunctional processing method used for a multifunctional processing apparatus having first control means for controlling the operations of exercising a plural number of functions, and connection means to which second control means for controlling the operations of exercising the same function as at least one of the plural number of functions is connected, the multifunctional processing method comprising the steps of: recognizing the connection of the second control means to the connection means; and causing the second control means, not the first control means, to control one function upon recognition of the connection by the recognizing means.

In this method, if the apparatus is not provided with the second control means, the first control means controls the operations of exercising the plural number of functions. At this time, if the second control means is connected to the connection means, the first and second control means perform the control operations in a parallel fashion.

DETAILED DESCRIPTION OF THE PREFERRED EMBODIMENTS

A multifunctional processing apparatus and method which are constructed according to the present invention will be described with reference to the accompanying drawings. In the description of the specification, the present invention is incorporated into a multifunctional processing apparatus used in a multifunctional digital machine having a multiple of functions, copy, printer and facsimile functions.

Figure 1:
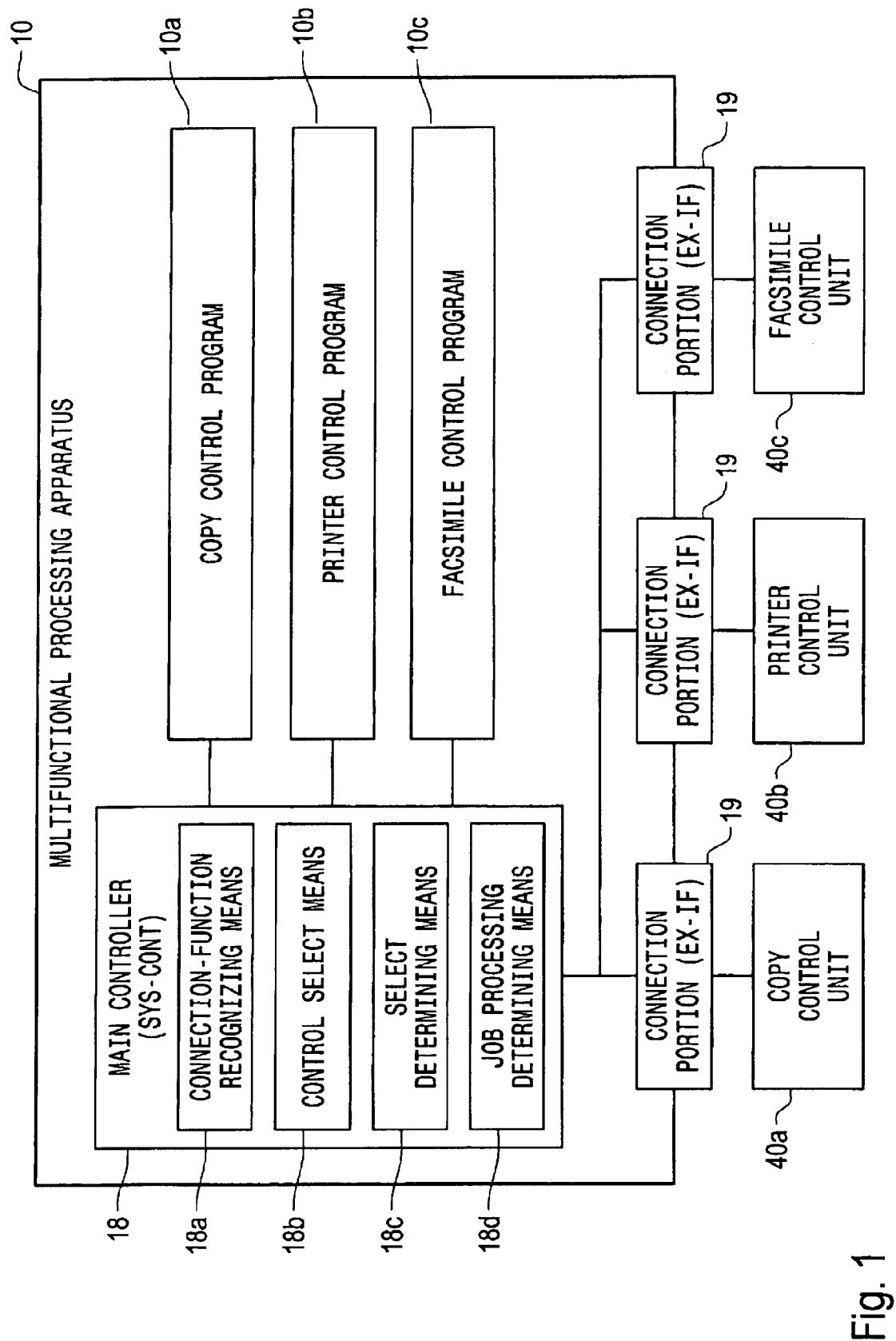
FIG. 1 is a block diagram showing functional arrangement of a multifunctional processing apparatus which is an embodiment of the present invention.
Figure 2:
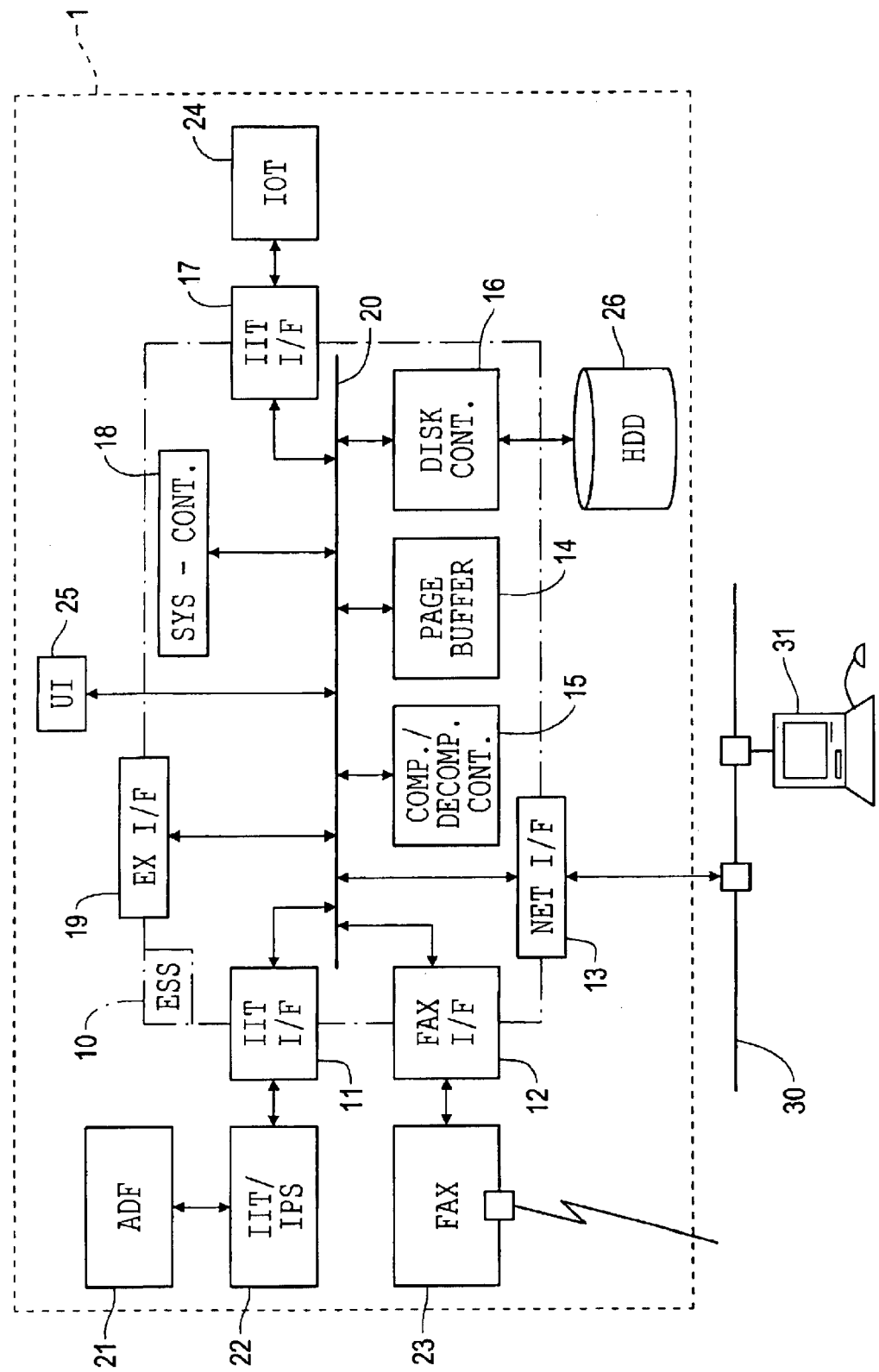
FIG. 2 is a block diagram showing a specific arrangement of the multifunctional digital machine into which the multifunctional processing apparatus is assembled.

FIG. 1 is a block diagram showing functional construction of a multifunctional processing apparatus which is an embodiment of the present invention. FIG. 2 is a block diagram showing a specific construction of the multifunctional digital machine into which the multifunctional processing apparatus is incorporated.

Before proceeding with description of the multifunctional processing apparatus, the multifunctional digital machine into which the multifunctional processing apparatus is incorporated will be described.

As shown in FIG. 2, a multifunctional digital machine 1 includes an image processing unit (electronic sub-system (ESS) 10 corresponding to the multifunctional processing apparatus, an automatic document feed (ADF) 21 and an image input terminal/image processing system (IIT/IPS) 22, which are used for realizing a copy function, a facsimile unit 23 for realizing a facsimile function, an image output terminal (IOT) 24 for outputting an image, a user interface (UI) 25 through which the user interactively communicates with the multifunctional digital machine, and a hard disc drive (HDD) 26 as a data memory device of large capacity. To handle the printer function, the multifunctional digital machine 1 is connected through a network 30 to a host computer 31.

The ESS 10 incorporated into the multifunctional digital machine 1 are provided for controlling the operations for exercising a multiple of functions of copy, printer and facsimile, and further the performs overall control for realizing the operations of exercising those functions. To this end, the ESS 10 includes an IIT interface (I/F) 11 for connection to the IIT/IPS 22, a FAX-I/F 12 for connection to the facsimile unit 23, a NET-I/F 13 for connection to the network 30, a page buffer (PB) 14 for temporarily storing image data received through those interfaces, a composition/decomposition controller (C/D-cont) 15 for composing and decomposing the image data as occasion demands, a disc controller (disc-cont) 16 for controlling the HDD 26, an IOT-I/F 17 for connection to the IOT 24, a system controller (sys-cont) 18 for controlling those functional units in accordance with job requests, an extension I/F (EX-I/F) 19 to be described in detail later, and a bus 20 for interconnecting those functional blocks.

Description to follow is elaboration of the control of the operations of exercising a copy function, a printer function and a facsimile function in the multifunctional digital machine 1.

1) (Copy Function)

An original document having an image (original image) depicted thereon, which is to be read, is located on the ADF 21 or a platen of the IIT/IPS 22, and the UI 25 issues a request of a job to use the copy function. Then, in the ESS 10, the sys-cont 18 requests the IIT/IPS 22 to read-out the original image from the original document (original). The ESS 10 receives image data that is read out through the photo-electric conversion process by and output from the IIT/IPS 22, and temporarily stores the received image data into the page buffer PB 14. At this time, if the IOT 24 is ready for the outputting of image data, the sys-cont 18 reads out the image data from the page buffer PB 14 and sends it through the IOT-I/F 17 to the IOT 24, and causes the IOT 24 to output the image on the basis of the xerography or electrophotograhy process. If the IOT 24 is not ready for the image outputting, the disc-cont 16 reads the image data out of the page buffer PB 14 and stores the readout one into the HDD 26. Thereafter, when the IOT 24 is ready for the image outputting, the sys-cont 18 causes the IOT 24 to output the image data in a similar manner.

In this way, the ESS 10 controls the operation of exercising the copy function. In a case where a job to output a plural number of images for one original is set, the image data that is read out of the original is stored into the HDD 26, and the reading of the image data out of the HDD 26 is repeated plural times and the readout ones are output.

2) (Printer Function)

When the host computer 31 transmits a request of a job to use the printer function and image data described in a page description language, for example, to the multifunctional digital machine 1, the ESS 10 receives the image data through the NET-I/F 13, and the C/D-cont 15 performs a process of decomposing the image data into such image data as to be acceptable by the IOT 24, and other processes. The page buffer PB 14 temporarily stores the image data thus processed, and the sys-cont 18 causes the IOT 24 to output the image data as in the case of the copy function.

In this way, the ESS 10 performs the control of the exercising operation of the printer function.

3) (Facsimile Function)

When the facsimile unit 23 receives facsimile data through public lines from a facsimile sender, the ESS 10 receives through the FAX-I/F 12 facsimile data that is received by the facsimile unit 23 in response to a request of a job to use the facsimile function from the facsimile unit 23, and thereafter the page buffer PB 14 temporarily stores the facsimile data as image data. Thereafter, the sys-cont 18 causes the IOT 24 to output the image data as in the cases of the copy function and the printer function.

To send facsimile data to a facsimile sender, in the ESS 10, the facsimile data is input to page buffer PB 14 or the HDD 26 from the IIT/IPS 22 or the host computer 31. And in the ESS 10, the C/D-cont 15 reads out the image data from the memory and carries out the process of decomposing the facsimile data and other processes; the sys-cont 18 sends the thus processed image data to the facsimile unit 23 through the FAX-I/F 12; and it causes the facsimile unit 23 to send the image data to the facsimile sender.

In this way, the ESS 10 controls the operation for facsimile transmission and reception, viz., the operation of exercising the facsimile function.

The ESS 10 that performs the operation controls, viz., the multifunctional processing apparatus 10 of the present embodiment, will be further described in more detail.

The multifunctional processing apparatus 10 is mounted on a single electronic circuit board, for example, and as shown in FIG. 1, includes a copy control program 10a, a printer control program 10b, a facsimile control program 10c, and a main controller 18.

The copy control program 10a is executed by the main controller 18 to control the operation of exercising the copy function. The printer control program 10b is executed by the main controller 18 to control the operation of exercising the printer function. The facsimile control program 10c is executed by the main controller 18 to control the operation of exercising the facsimile function. Those control programs 10*a* to 10*c* are stored into a memory, e.g., a RAM (random access memory), not shown.

Figure 7:
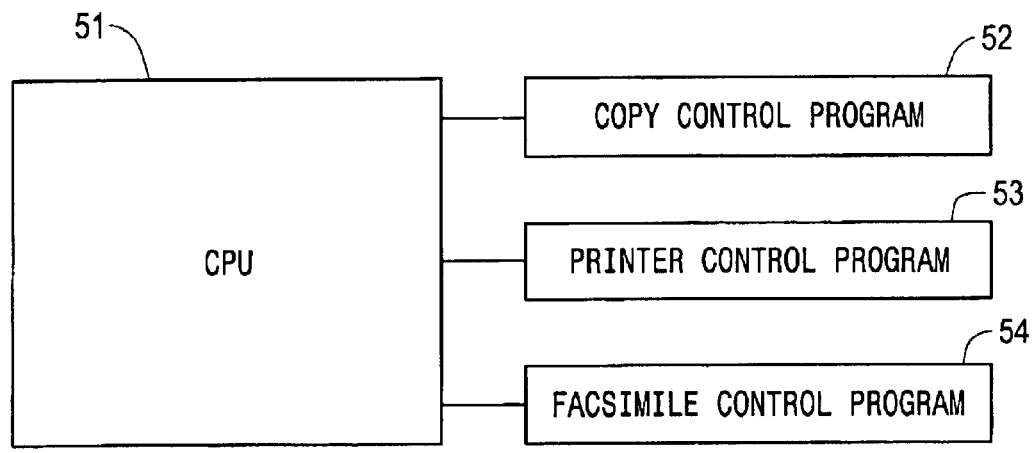
FIG. 7 is a block diagram showing a conventional multifunctional processing apparatus.
Figure 8:
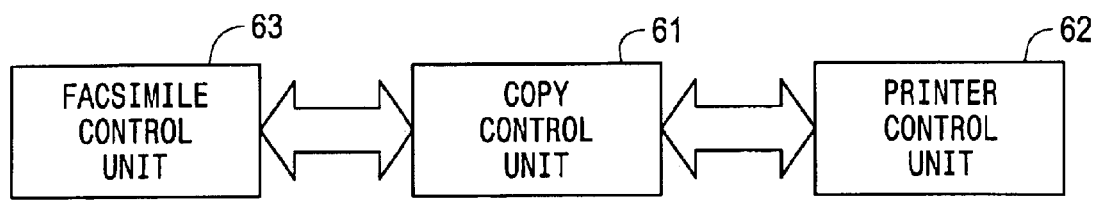
FIG. 8 is a block diagram showing another multifunctional processing apparatus.

The main controller 18 corresponds to the sys-cont 18 of the ESS 10 (FIG. 2), and includes one CPU and others. The main controller 18 executes the control programs 10*a* to 10*c*, and controls the operations of exercising a multiple of functions, e.g., copy function, printer function and facsimile function. The main controller 18 executes the control programs in a time division manner as in the conventional apparatus (FIG. 7).

The main controller 18 performs the controls necessary for realizing the exercising operations of the respective functions in addition to the controls of the exercising operations of those functions of copy, printer and facsimile machine. The overall control, e.g., the control of the operations of the respective portions of the ESS 10, is performed by the main controller 18. The overall control is performed through the execution of a related control program in the main controller 18.

The overall control includes a recognition process and a select determining process by a control unit (to be described in detail later), the issuing of operation requests to the IIT/IPS 22 and the IOT 24, and the control of the overall multifunctional digital machine 1.

The multifunctional processing apparatus 10 includes connection portions 19 that are essential to the present invention, in addition to the control programs 10*a* to 10*c* and the main controller 18. Further, the main controller 18 includes the functions of connection-function recognizing means 18*a*, control select means 18*b*, select determining means 18*c* and job-processing determining means 18*d*.

The connection portions 19 correspond to the EX-I/F 19 (FIG. 2), and more specifically constructed with connections slots (connectors) mounted on the electronic circuit board. When a plural number of control units, typically designated by reference numerals 40*a*, 40*b*, 40*c*, are inserted into the connection portions 19, the connection portions electrically and functionally connect those control units to the main controller 18.

The control units 40*a*, 40*b*, 40*c* (generally designated by numeral 40 frequently) to be connected to the connection portions 19 are provided for controlling the operations of exercising the functions (copy, printer and facsimile functions) which are under control of the main controller 18, respectively. Specifically, a copy control unit 40*a*, a printer control unit 40*b* and a facsimile control unit 40*c* are used in this instance. It is not essential that those control units are simultaneously connected to the connection portions 19. Alternatively, a single control unit may be used for controlling a plural number of functions; a single or a plural number of connection portions 19 may be provided for the bus 20.

Of those control units 40*a*, 40*b*, 40*c*, the facsimile control unit 40*c* for controlling the operation of exercising the facsimile function will be typically be described.

Figure 3:
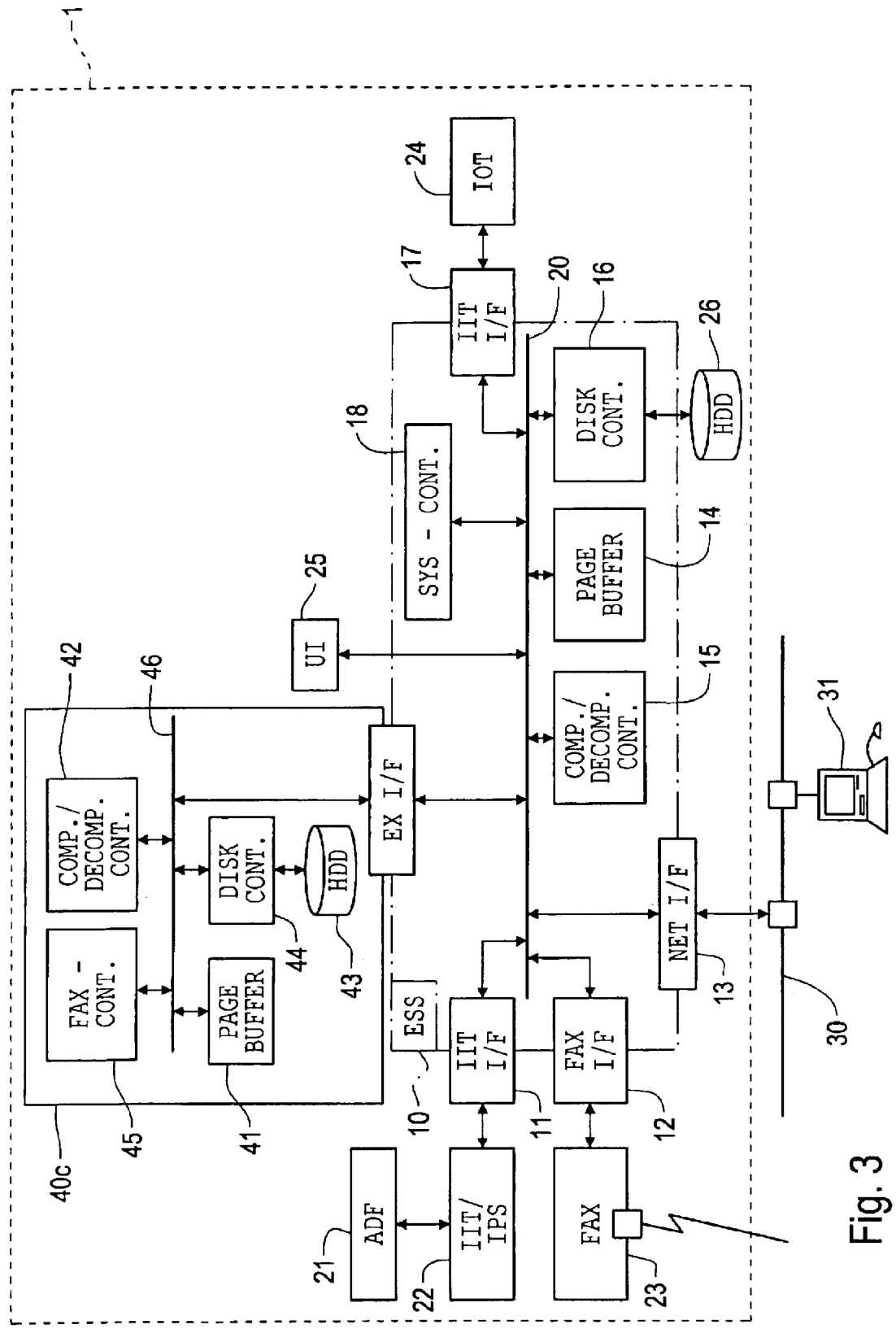
FIG. 3 is a block diagram showing the FIG. 2 apparatus into which a facsimile control unit is coupled.

The facsimile control unit 40*c*, as shown in FIG. 3, is connected to the EX-I/F 19 of the ESS (multifunctional processing apparatus) 10, and is capable of controlling the operation of exercising the facsimile function in the multifunctional digital machine 1. For this reason, the facsimile control unit 40*c* includes a PB 41 functioning like the page buffer PB 14 in the ESS 10, a C/D-cont 42 functioning like the C/D-cont 15, a HDD 43 functioning like the HDD 26, a disk-cont 44 for controlling the HDD 43, a FAX-cont 45 which includes a CPU and others and controls the related portions, and functions like the sys-cont 18, and a bus 46 for interconnecting those functional blocks.

The thus arranged facsimile control unit 40*c*, when coupled into the connection portion 19, controls the operation of exercising the facsimile function in the multifunctional digital machine 1. The same thing is correspondingly applied to the copy control unit 40*a* and the printer control unit 40*b*.

As already stated, the main controller 18 includes the functions of connection-function recognizing means 18*a*, control select means 18*b*, select determining means 18*c* and job-processing determining means 18*d* (FIG. 1). Those functions are realized through the execution of the related control programs as in the overall control in the main controller 18.

The connection-function recognizing means 18*a* recognizes connection or nonconnection of any or two or more number of the control units 40*a*, 40*b*, 40*c* to the connection portions 19; if any of the control units is connected to the connection portion 19, the recognizing means 18a recognizes a type of the connected control unit (kind of the function to be controlled).

When the connection-function recognizing means 18*a* recognizes the connection of the control units 40*a*, 40*b*, 40*c* to the connection portions 19, the control select means 18*b* causes the control units 40*a*, 40*b*, 40*c* or the main controller 18 to control the operations of exercising the functions of which the exercising operations can be controlled by the control units 40*a*, 40*b*, 40*c*. In other words, the control select means 18*b* selects the processor to process the control of the operations of exercising the respective functions (of copy, facsimile, printer), i.e., the control units 40*a*, 40*b*, 40*c* or the main controller 18. The control select means 18*b* selects the processor for processing the overall control that is performed by the main controller 18, addition to the processor for controlling the operations of exercising the respective functions.

The select determining means 18*c* judges on the selection of the processor that is made by the control select means 18*b*, viz., which of the control units 40*a*, 40*b*, 40*c* and the main controller 18 is to be used for controlling the operations of exercising the respective functions, and sends the result of the judgement to the control select means 18*b*.

The job-processing determining means 18*d* determines an priority order of executing those functions of which the exercising operations are controlled by the control units 40*a*, 40*b*, 40*c* or the main controller 18 in accordance with a predetermined setting. An instruction entered from the UI 25 may also be used for the determination of the priority order of the function execution.

Some examples of processing operations by the thus constructed multifunctional processing apparatus 10 will be described.

(First Processing Operation)

A first processing operation defined in aspects 1, 2, 3, 13 and 14 will first be described.

It is assumed that the facsimile control unit 40*c* is connected to the connection portion 19 and the facsimile unit 23 issues a request of processing a facsimile reception job, for ease of explanation.

When the facsimile unit 23 issues a facsimile reception job, the main controller 18 behaves such that the connection-function recognizing means 18*a* recognizes connection or nonconnection of any or two or more number of control units 40*a*, 40*b*, 40*c* are connected to the connection portions 19. A possible way to make the recognition is to check if the connection-function recognizing means 18*a* can transfer and receive a signal to and from the control units 40*a*, 40*b*, 40*c* through the connection portions 19. In a case where dip switches, for example, are provided on the circuit board of the multifunctional processing apparatus 10, that recognition may be made on the basis of the setting of the dip switches. In this case, the dip switches are set in advance by a person who connects the control units 40a, 40b, 40c to the connection portions 19.

If the recognition is that none of the control units 40a, 40b, 40c is connected to the connection portions 19, the main controller 18 operates such that the requested facsimile reception job is processed through the execution of the facsimile control program 10c.

Following the recognition of connection of the control units 40a, 40b, 40c, the select determining means 18c recognizes a kind of the requested job and a kind of the control unit or units 40a, 40b, 40c connected, viz., a kind of the function or functions of the connected control unit or units 40a, 40b, 40. The above-mentioned recognition method is available for those recognition.

In this instance, it is assumed that the facsimile control unit 40c is connected to the connection portion 19. Therefore, the connection-function recognizing means 18a recognizes the connection of the facsimile control unit 40c, and a kind of it.

When the connection-function recognizing means 18a recognizes the connection of the facsimile control unit 40c, the control select means 18b causes the facsimile control unit 40c, not the main controller 18, to control the operation of exercising the facsimile function. Specifically, the control select means 18b transfers the facsimile reception job requested to be processed and the image data associated with the job to the facsimile control unit 40c, and causes the unit 40c to process the job and the image data.

In this case, judgement as to whether or not the control select means 18b permits the facsimile control unit 40c to process the facsimile reception job may be made in response to an instruction from the select determining means 18c. In this case, the select determining means 18c chooses one between the main controller 18 and the facsimile control unit 40c to process the facsimile reception job on the basis of a connection status of the facsimile control unit 40c to the connection portions 19 and a processing status in the facsimile control unit 40c. In case where the facsimile control unit 40c is connected to the connection portion 19, if the facsimile control unit 40c is processing another job, the select determining means 18c chooses the main controller 18 to process the facsimile reception job. A connection status of and a processing status in the facsimile control unit 40c may be judged as in the recognition in the connection-function recognizing means 18a.

The processing ability of the facsimile control unit 40c defined by, for example, an operation frequency of the FAX-cont 45 and a memory capacity of the HDD 43, may also be used for determining the requested-job destined processor, the main controller 18 or the facsimile control unit 40c, in addition to the connection status of and the processing status in the facsimile control unit 40c. In this case, the destined processor having the higher processing ability is chosen to process the requested job.

If a function to choose the destined processor, i.e., the main controller 18 or the facsimile control unit 40c, to process the facsimile reception job is provided in the UI 25 of the multifunctional digital machine 1, the select determining means 18c may choose the suitable destined processor in accordance with the choice set by the UI 25.

In the multifunctional processing apparatus 10 based on the first processing operation thus far described, if the control units 40a, 40b, 40c are connected to the connection portions 19, the main controller 18 or the control units 40a, 40b, 40c is chosen for controlling the operations of exercising the functions that can be controlled by the control units 40a, 40b, 40c. Therefore, even if the functions different from each other or the controls for the same function are competitive, if the control units 40a, 40b, 40c are connected to the connection portions 19, the main controller 18 and the control units 40a, 40b, 40c can process the functions concurrently. In other words, there is no need of time-divisional processing of the functions by the main controller 18, and the control processing is quickened.

Additionally, in the multifunctional processing apparatus 10, even if the control units 40a, 40b, 40c are not connected to the connection portions 19, the main controller 18 can control the operations of exercising the respective functions. Therefore, there is no need of providing the control units 40a, 40b, 40c in advance. In other words, the multifunctional processing apparatus 10 may be adopted for the multifunctional digital machine 1 without complexity of the apparatus arrangement. This results in providing an inexpensive multifunctional digital machine 1.

If the control units 40a, 40b, 40c of the multifunctional processing apparatus 10 are provided as optional products, the multifunctional digital machine 1 may be supplied as inexpensive products to the market. In a case where the quick control processing is required, all the user has to do is to connect those optional products, i.e., the control units 40a, 40b, 40c, to the portions to thereby extend the function. Therefore, it is easy to make the function extension and the performance improvement of the multifunctional digital machine 1. If the processing ability (defined by e.g., operation frequency and memory capacity) of each control unit 40a, 40b, 40c, is higher than that of the main controller 18, connection of the control unit further increases the control processing speed.

In the multifunctional processing apparatus 10 based on the first processing operation, the main controller 18 or the facsimile control unit 40c is chosen to control the operations of exercising the respective functions on the basis of a connection status of the facsimile control unit 40c to the connection portions 19 and a processing status in the facsimile control unit 40c. Therefore, the main controller 18 and the facsimile control unit 40c may control the operations of exercising the respective functions in a sharing manner, if necessary. In this respect, the overall operation control by the multifunctional digital machine 1 is considerably efficient.

The case where the facsimile control unit 40c processes the facsimile reception job was used in the description of the first processing operation. The same thing is correspondingly applied to the copy control unit 40a and the printer control unit 40b.

(Second Processing Operation)

A second processing operation by the multifunctional processing apparatus 10 will be described. The second processing operation is defined in aspects 4 and 5.

The second processing operation allows each control unit 40 to selectively be used for the overall control as well as the operation controls of the respective functions. More specifically, the control select means 18b selects the destined processor, i.e., the main controller 18 or the control unit 40, to control not only the operations of exercising the respective functions but also the overall control that the main controller 18 performs.

when the facsimile unit 23 issues a request of processing the facsimile reception job, the connection-function recognizing means 18a recognizes connection or nonconnection of the control unit 40 (40a, 40b, 40c) to the connection portion 19. If it recognizes the connection of the control unit, the control select means 18*b* transfers the facsimile reception job requested to be processed and image data associated with the job to their related control unit 40, and the subsequent processing of the facsimile reception job is performed by the destined control unit 40.

It is assumed that the control select means 18*b* transfers the job and the image data to the control unit 40 only when connection of a specific control unit or units are made. The specific control unit may be connected to the connection portion 19 or designated by use of dip switches. In this case, the control unit 40 of which the processing ability is higher than that of the main controller 18 is preferably used as the specific control unit. This reason for this will be described later.

In the description to be given hereunder, the copy control unit 40*a* is the specific control unit.

The copy control unit 40*a*, or the destined processor, receives a facsimile reception job from the main controller 18, and performs the overall control necessary for realizing the operation of exercising the facsimile function as in the first processing operation. Specifically, the copy control unit 40*a* recognizes the control unit 40 connected to the connection portion 19 of the multifunctional processing apparatus 10; determines the processor to which the facsimile reception job is destined for its processing, i.e., the main controller 18 or the facsimile control unit 40*c*; and causes the determined, destined processor to process the facsimile reception job.

It is assumed here that the copy control unit 40*a* as the job destined processor has the functions equivalent to those of the main controller 18, for example, the functions of the connection-function recognizing means 18*a*, the control select means 18*b* and the select determining means 18*c*, when it receives the facsimile reception job. Alternatively, the copy control unit 40*a* may acquire those functions by down-loading the related programs from the main controller 18 through the connection portion 19.

In the multifunctional processing apparatus 10 based on the second processing operation, the overall control as well as the operation controls of the respective functions maybe destined, for their processing, to the control unit 40, if it is connected to the connection portion 19. Therefore, the overall control may be processed by the main controller 18 and the control units 40*a*, 40*b*, 40*c* in a parallel manner. Then, the multifunctional processing apparatus 10 may accept requests of processing a plural number of jobs, so that the control processing speed is increased.

The multifunctional processing apparatus 10 based on the second processing operation enables the specific control unit 40, if it is connected to the connection portion 19, to carry out the processing for the overall control. Therefore, if the control unit 40 having a higher processing ability than the main controller 18 is set in advance as the specific control unit, the overall control is processed at higher speed than that of the main controller 18. Thus, the processing speed of the multifunctional digital machine 1 may be increased by merely connecting the control unit 40 to the connection portion 19.

(Third Processing Operation)

A third processing operation by the multifunctional processing apparatus 10 will be described. The third processing operation is defined in aspects 6, 7 and 8.

In the description to follow, it is assumed that a plural number of connection portions 19 are provided, and that the copy control unit 40*a*, the printer control unit 40*b* and the facsimile control unit 40*c* are connected to the connection portions 19.

The copy control unit 40*a*, the printer control unit 40*b* and the facsimile control unit 40*c* are connected to the multifunctional processing apparatus 10 based on the present processing operation. Therefore, if the jobs to use the copy function, printer function and the facsimile function are competitive, the copy control unit 40*a*, the printer control unit 40*b* and the facsimile control unit 40*c*, or the main controller 18 may control the operations of exercising those functions in a parallel manner as in the first or second processing operation.

The IOT 24 for outputting the image data as the result of processing of each job is a common resource to those control units 40*a*, 40*b* and 40*c*. When the requests of outputting the image data to the IOT 24 are competitive, the image data must be sequentially output in the IOT 24 although the control units 40*a*, 40*b* and 40*c* and the main controller 18 control the operations of exercising those functions in a parallel manner. The same thing is true for other common resources.

Those jobs are not uniform in the immediacies of initiating the processing of them. The facsimile job and the copy job need to be processed immediately, but the print job is allowed to have some delay in initiating its processing.

To cope with this non-uniformity of the immediacies, the main controller 18 includes the job-processing determining means 18*d*; when a plural number of requests to use the common resource concurrently appear, the job-processing determining means 18*d* arbitrates among those requests. When the destined processor is selected for processing the overall control as referred to in the description of the second processing operation, the control unit 40, not the main controller 18, arbitrates among those requests.

The arbitration by the job-processing determining means 18*d* will be described in detail.

In a situation where the main controller 18 engages in the overall control of the multifunctional digital machine 1, and the copy control unit 40*a* and the printer control unit 40*b* concurrently issue the requests of using the IOT 24, the control select means 18*b* in the main controller 18 arbitrates between those requests in accordance with a priority order determined in advance. For the priority order, facsimile reception, copy, facsimile transmission and printer are ranked in this order in a descending manner; the highest priority is assigned to the facsimile reception and the lowest priority, to the print. Therefore, in the above situation, the job-processing determining means 18*d* permits the copy control unit 40*a* to first use the IOT 24.

The priority order is set in advance by use of a memory or dip switches, both not shown. If necessary, the function to set the priority order may be incorporated into the UI 25. In this case, the user may set the priority order by use of the UI 25.

The job-processing determining means 18*d* arbitrates among the functions that are equal to one another, while it arbitrates among the different functions in the above instance. In an example where a plural number of the same kinds of control units are coupled to the connection portions 19, the job-processing determining means 18*d* arbitrates among the requests issued by those control units in a preset priority order. In this case, the priority order may be determined depending on the positions of the connection portions 19.

The multifunctional processing apparatus 10 based on the third processing operation can handle a plural number of functions by coupling the control units 40*a*, 40*b*, 40*c* into the connection portions 19, thereby enhancing its multifunctional performance.

Further, the multifunctional processing apparatus 10 has an arbitrating function: when the control units 40a, 40b, 40c concurrently issue requests to use the common resource within the multifunctional digital machine 1, the job-processing determining means 18d arbitrates among those requests to permit the job of the highest immediacy to use the common resource at the highest priority. The multifunctional processing apparatus 10 provides the multifunctional digital machine 1, when it is incorporated thereinto, which satisfies the requirements in handling the machine or is easy to handle.

Further, the multifunctional processing apparatus 10 allows the user to set the priority order through the UI 25, and accepts the individual requests by the users. In this respect, the multifunctional digital machine 1 incorporating the multifunctional processing apparatus 10 thereinto is versatile in use.

(Another Embodiment)

An additional multifunctional processing apparatus which is another embodiment of the present invention will be described. This multifunctional processing apparatus is defined in aspects 9 and 10.

Figure 4A:
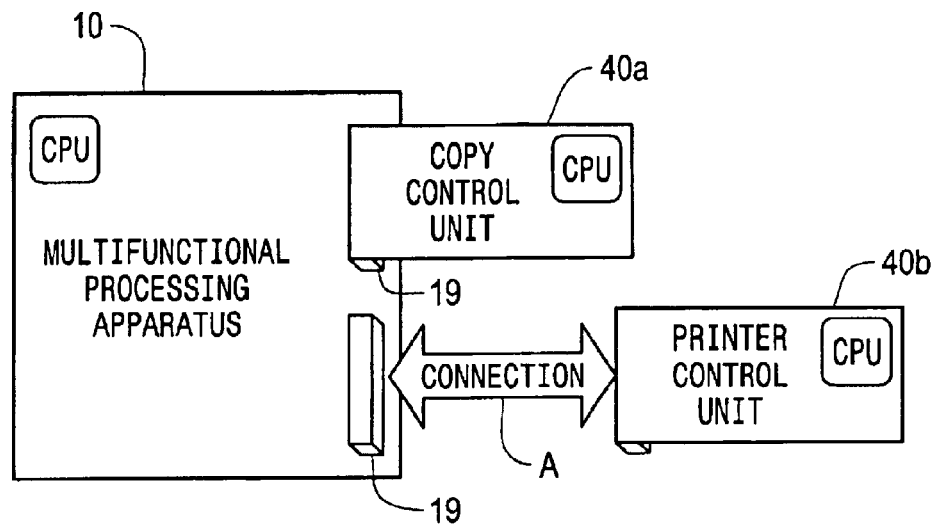
FIG. 4 is a diagram showing connections of the control units to the multifunctional processing apparatus, FIG. 4A showing a first connection of the control units used in the first embodiment of the invention.
FIG. 4B showing a second connection of the control units employed in the second embodiment of the invention.

In the description of the above-mentioned embodiment, in particular the third processing operation, the multifunctional processing apparatus 10 is provided with the plural number of connection portions 19, and the control units 40a, 40b, 40c are coupled into these connection portions (FIG. 4A).

Figure 4B:
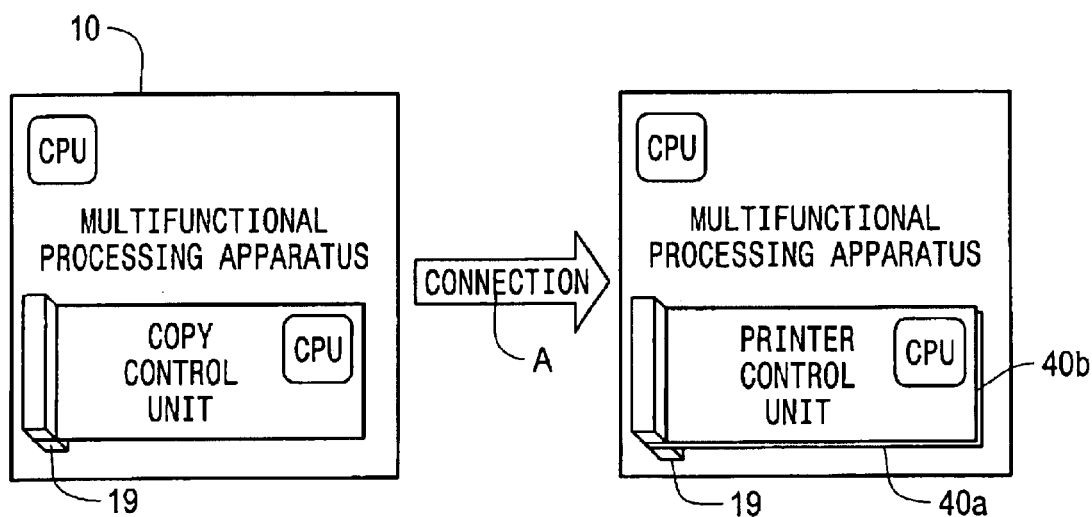

In the present embodiment, a plural number of control units 40a, 40b, 40c are cascade connected to a single connection portion 19, as shown in FIG. 4B.

Here, the cascade connection is a series connection containing two or more stages arranged in a series manner in which the output of one stage is connected to the input of the succeeding stage, and so on. Therefore, to connect the control units 40a, 40b, 40c in a cascade fashion, as shown, the output of the copy control unit 40a is connected to the input of the printer control unit 40b, and the output of the printer control unit 40b is connected to the input of the facsimile control unit 40c.

In this sense, the control units 40a, 40b, 40c are provided with the connection portions 19, respectively.

The first to third processing operations in the multifunctional processing apparatus 10 of the above-mentioned or first embodiment are valid in the multifunctional processing apparatus 10 cascaded coupled with the control units which is the present or second embodiment.

Figure 5:
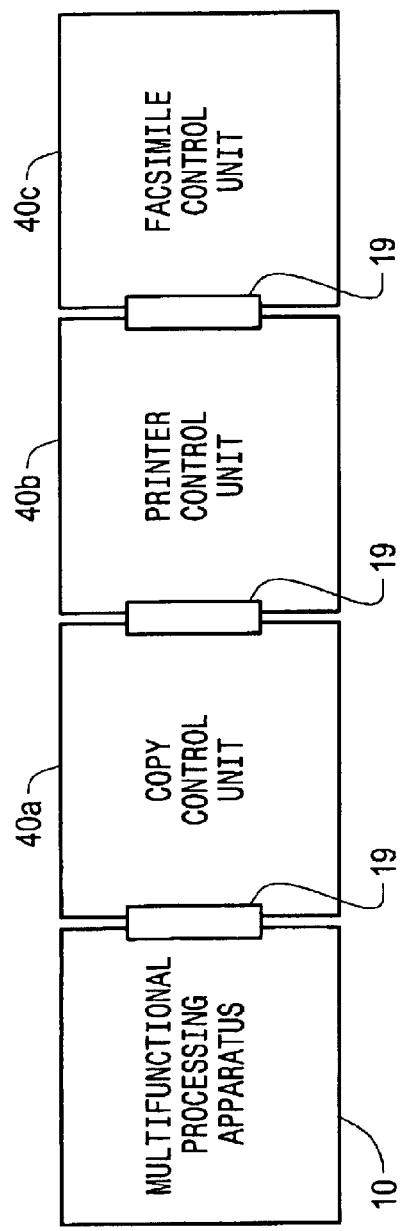
FIG. 5 is a diagram showing an arrangement of different functions for the multifunctional processing apparatus of FIG. 4B second embodiment.

In the multifunctional processing apparatus 10, the job-processing determining means 18d in the main controller 18 determines the priority order in exercising the functions under control of the control units 40a, 40b, 40c, on the basis of connection positions in the cascade connection of the control units 40a, 40b, 40c. As shown in FIG. 5, the control units 40a, 40b, 40c are cascade connected to the multifunctional processing apparatus 10 in such a manner that the copy control unit 40a is located closest to the apparatus 10, the facsimile control unit 40c is located farthest from the apparatus 10, and the printer control unit 40b is located between the control units 40a and 40b. The job-processing determining means 18d determines the priority order of the thus cascade connected control units 40a, 40b, 40c such that the highest priority is assigned to the copy control unit 40a, the medium priority, to the printer control unit 40b, and the lowest priority, to the facsimile control unit 40c. Thus, the highest priority is assigned to the copy control unit 40a that is closest to the multifunctional processing apparatus 10.

This assignment is made to reduce the time to choose the processor to which the operation control and the overall control are destined.

The cascade connection of the control units 40a, 40b, 40c accrues to a space saving (when comparing with the case of the control units being not cascaded connected) and size reduction of the multifunctional processing apparatus 10 and the multifunctional digital machine 1 having the apparatus 10 incorporated thereinto.

As described above, in the multifunctional processing apparatus 10, the job-processing determining means 18d uses the connection positions in the cascade connection of the control units 40a, 40b, 40c for determining the priority order in exercising the functions under control of the control units 40a, 40b, 40c.

Therefore, if the highest priority is assigned to the copy control unit 40a that is closest to the multifunctional processing apparatus 10, it is possible to reduce the time to choose the processor to which the operation control and the overall control are destined.

In each of the above-mentioned embodiments, the multifunctional processing apparatus 10 contains the copy control program 10a, the printer control program 10b, and the facsimile control program 10c. Where the multifunctional processing apparatus includes means for causing the main controller 18 to receive programs from exterior through the connection portion 19 and to store into a memory (aspect 11), the control programs 10a to 10c may be fetched from exterior (e.g., control units 40a, 40b, 40c) by the up-loading technique. In this case, the program for the overall control may also be up-loaded. Use of such means makes it easy to develop programs and to extend the functions.

In the above-mentioned embodiments, the main controller 18 and the control units 40a, 40b, 40c include CPUs one for each function block. Those function blocks may be constructed with relay circuits, sequencer units or the like, which do not include CPUs, if those blocks are able to execute the processing operations. Use of the CPUs has advantages of high processing speed and apparatus size reduction, however.

In each embodiment mentioned above, the IIT/IPS 22, the IOT 24 and the like operate when it receives requests to operate them from the main controller 18, for example; however, those may be of the type which operate under control of the main controller 18, for example.

To be more specific, the IIT/IPS 22, the IOT 24 and the like are categorized into two types. A first type of them (in the above-mentioned embodiments) contains control units with CPUs and others and the control units perform the operation controls when receiving requests to operate. A second type of them needs the aid of the control of another device to effect the operation controls. In the multifunctional processing apparatus using the second type of the IIT/IPS 22 and the like, which requires the aid of another device for their control, the main controller 18 must perform the operation controls in place of them. Also in this multifunctional processing apparatus, if the destined processor is selected for the overall control as in the second processing operation, a high speed processing control is realized.

Figure 6:
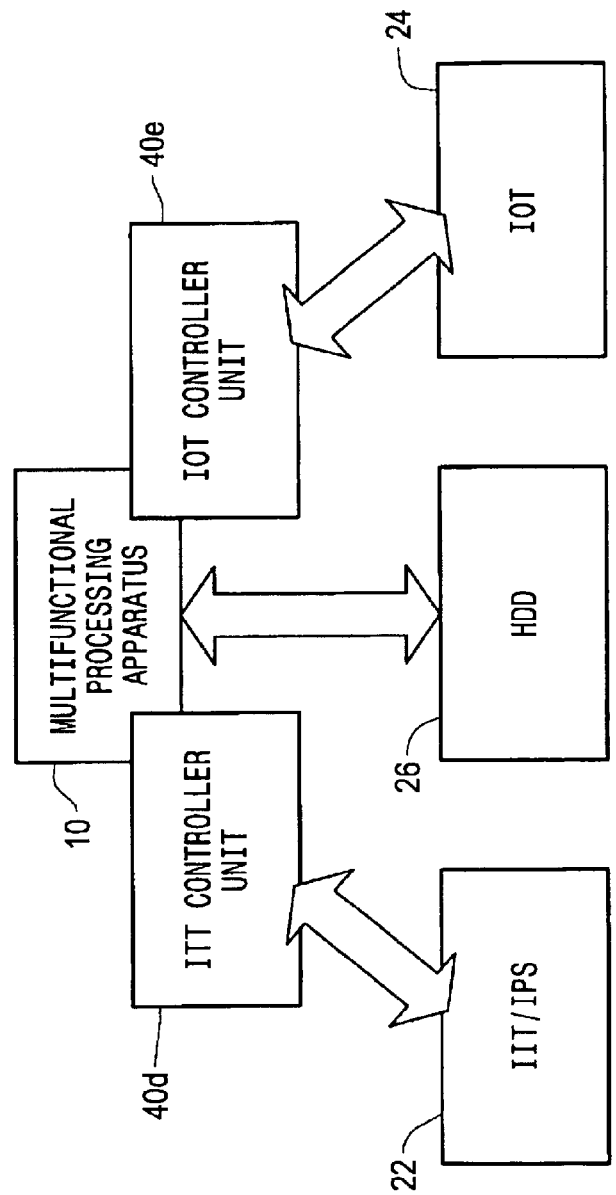
FIG. 6 is a block diagram showing a modification of the multifunctional processing apparatus constructed according to the present invention.

An IIT control unit 40d for controlling the operation of the IIT/IPS 22 and an IOT control unit 40e for controlling the operation of the IOT 24 maybe connected to the connection portions 19 as shown in FIG. 6. This arrangement can handle the image reading by the IIT/IPS 22 and the image outputting by the IOT 24 as by the copy function, printer function and facsimile function. Therefore, the arrangement provides considerably efficient operation controls by the IIT/IPS 22 and the IOT 24.

As seen from the foregoing description, in the multifunctional processing apparatus and method of the invention, if second control means is connected to the connection means, the first and second control means control the exercising of the functions in a parallel fashion. The result is that a high speed control processing is realized. If the second control means is not connected to the connection means, the first control means is cable of controlling the exercising of the functions. Therefore, in this case, no problem arises if the second control means is not used. The result is that no complexity of the apparatus construction is created and hence the cost to manufacture is not increased.

Thus, if the second control means in the multifunctional processing apparatus and method are provided as optional products, the resultant multifunctional digital machine is inexpensive. If the quick control processing is required, all the user has to do is to connect those optional products, i.e., the control units, to the portions to thereby extend the function. Therefore, the user can make it easy to extend the apparatus function extension and to improve the apparatus performance.

What is claimed is:

1. A multifunctional processing apparatus comprising:
   first control means for controlling the operation of exercising a plural number of functions;
   connection means to which second control means for controlling the operation of at least one of said plural number of functions is connected;
   recognizing means for recognizing the connection of said second control means to said connection means and recognizing a kind of the function which the connected second control means exercises; and
   control select means for causing one of said first and second control means to control said recognized kind of function upon recognition of said connection by said recognizing means, the recognizing means recognizing the kind of function from the plurality of functions.

2. The multifunctional processing apparatus of claim 1, wherein
   when said recognizing means recognizes the connection of said second control means, said control select means causes said second control means to control the operation of exercising said at least one function.

3. The multifunctional processing apparatus of claim 1, further comprising:
   judging means for judging which of said first and second control means is to be used for controlling the operation of exercising said at least one function on the basis of a connection status of said second control means in said connection means and a processing status in said second control means connected to said connection means, and said judging means transmitting the result of the judgement to said control select means.

4. The multifunctional processing apparatus of claim 1, wherein
   when said second control means is connected to said connection means, said control select means causes said second control means not only to perform the controlling of the operation of exercising said at least one function and but also to perform overall controls necessary for realizing the operations of exercising said at least one function.

5. The multifunctional processing apparatus of claim 4, wherein
   when a specific second control means is connected to said specific connection means, said control select means causes said second control means to perform said overall controls.

6. The multifunctional processing apparatus of claim 1, wherein
   a plural number of said connection means are provided.

7. A multifunctional processing apparatus, comprising:
   first control means for controlling the operation of exercising a plural number of functions;
   a plurality of connection means to which second control means for controlling the operation of at least one of said plural number of functions is connected;
   recognizing means for recognizing the connection of said second control means to said plurality of connection means;
   control select means for causing one of said first and second control means to control said at least one function upon recognition of said connection by said recognizing means; and
   determining means for determining the priority order in exercising the functions under control of said second control means to be connected to said plurality of connection means.

8. The multifunctional processing apparatus of claim 7, further comprising:
   setting means for setting the priority order which otherwise would be determined by said determining means.

9. The multifunctional processing apparatus of claim 8, wherein
   said plural number of second control means are connected to said connection means in a cascade fashion.

10. The multifunctional processing apparatus of claim 9, further comprising:
    determining means for determining the priority order in exercising the functions under control of said second control means to be cascade connected to said plurality of connection means, on the basis of connection positions in the cascade connection.

11. The multifunctional processing apparatus of claim 1, further comprising:
    program receiving means for receiving a first control program to control the operations of exercising said plural number of functions by said first control means and/or a second control program for the overall control that is necessary for realizing the exercising of said plural number of functions, from exterior through said connection means.

12. The multifunctional processing apparatus of claim 1, wherein
    said first control means includes one CPU and each said second control means also includes one CPU.

13. A multifunctional processing method used for a multifunctional processing apparatus having first control means for controlling the operations of exercising a plural number of functions, and connection means to which second control means for controlling the operations of at least one of said plural number of functions is connected, the recognizing means recognizing the kind of function from the plurality of functions, said multifunctional processing method comprising the steps of:
    recognizing the connection of said second control means to said connection means and recognizing a kind of the function which the connected second control means exercises; and
    causing said second control means, not said first control means, to control said recognized kind of function upon recognition of said connection by said recognizing means.

14. A multifunctional processing method used for a multifunctional processing apparatus having first control means for controlling the operations of exercising a plural number of functions, and connection means to which second control means for controlling the operation of at least one of said plural number of functions is connected, the recognizing means recognizing the kind of function from the plurality of functions, said multifunctional processing method comprising the steps of:

recognizing the connection of said second control means to said connection means and recognizing a kind of the function which the connected second control means exercises;

judging which of said first and second control means is to be used for controlling the operation of exercising said recognized kind of function, upon recognition of the connection of said second control means; and causing one of said first and second control means to control the operation of exercising said at least one function, on the basis of the judging result.

* * * * *